Figure 1:
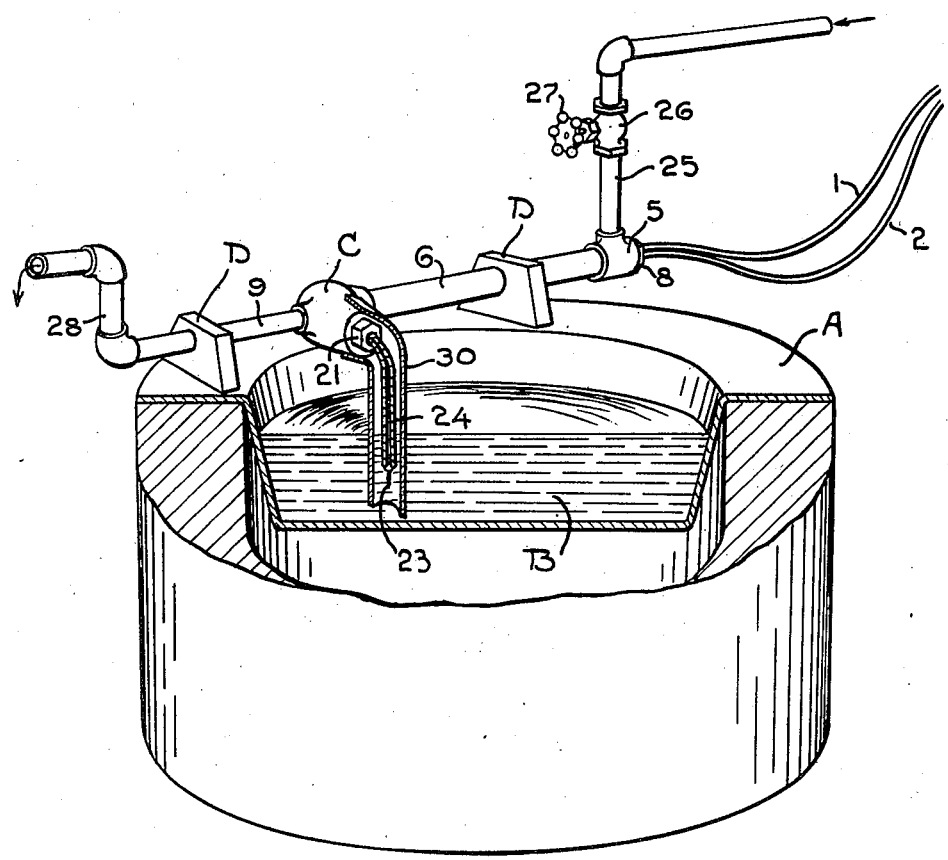

F. J. NICE.
PYROMETER.
APPLICATION FILED AUG. 24, 1912.

1,054,442.

Patented Feb. 25, 1913.

2 SHEETS—SHEET 1.

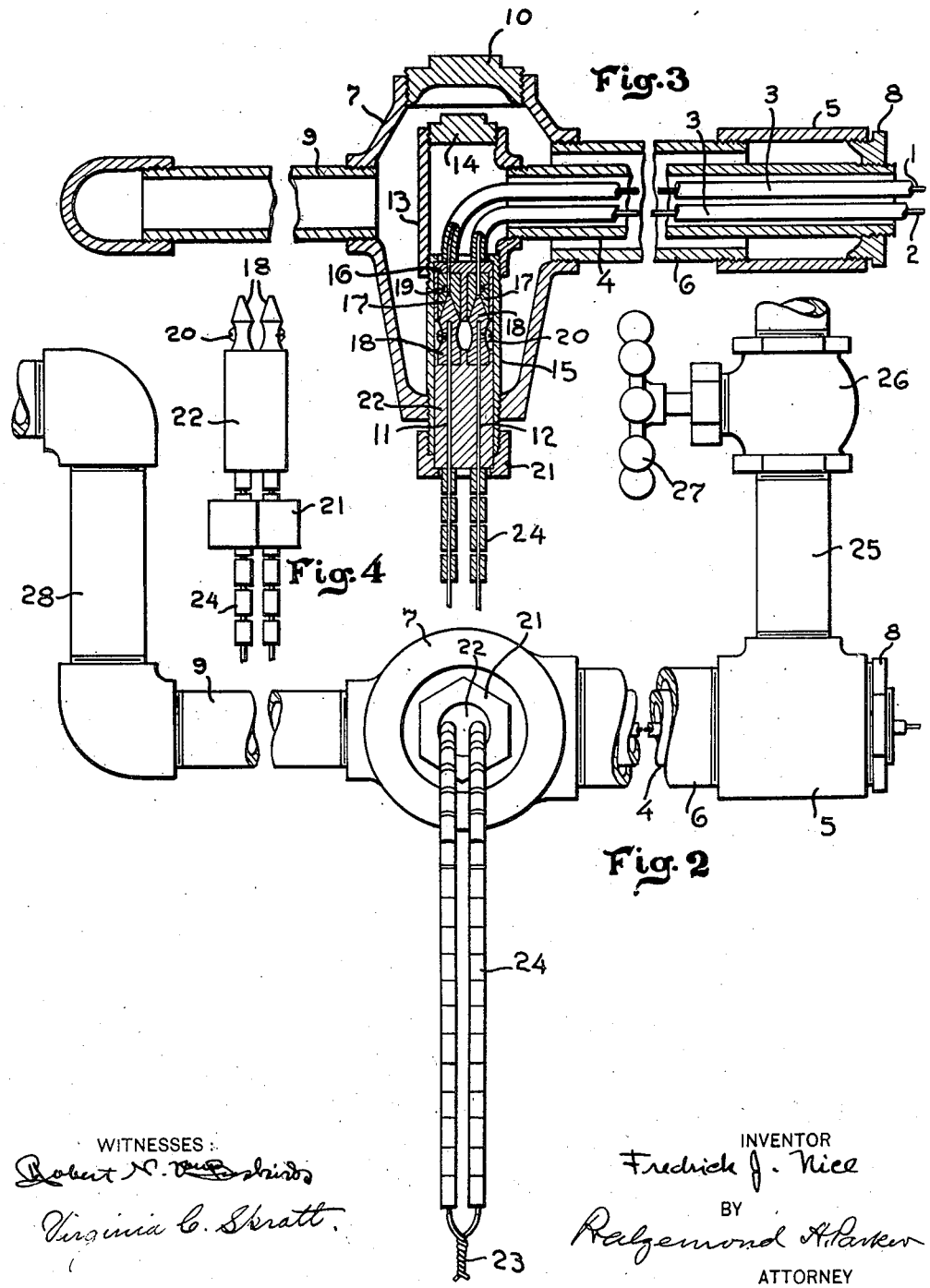

UNITED STATES PATENT OFFICE.

FREDRICK J. NICE, OF PONTIAC, MICHIGAN.

PYROMETER.

1,054,442.  Specification of Letters Patent.  Patented Feb. 25, 1913.

Application filed August 24, 1912. Serial No. 716,813.

*To all whom it may concern:*

Be it known that I, FREDRICK J. NICE, a citizen of the United States, residing at Pontiac, county of Oakland, State of Michigan, have invented a certain new and useful Improvement in Pyrometers, and declare the following to be a full, clear, and exact description of the same, such as will enable others skilled in the art to which it pertains to make and use the same, reference being had to the accompanying drawings, which form a part of this specification.

This invention relates to pyrometers and has for its object a form of pyrometer whose measurements of temperature are made by the difference of conductivity occasioned upon two electrical conductors of different metals. To insure the heat effects taking place upon the electrical conductors over a definite distance, a cooling medium is employed. Heretofore pyrometers of this type have been unreliable after a few minutes in the medium to be measured by reason of the heat effects being allowed to take place over indefinite portions of the conductors. In my structure, the pyrometer may be in constant contact with the medium whose temperature is to be measured and a constant and accurate indication of that temperature may be had.

A further feature of this invention is the structural arrangement by which the pyrometer wires may be coupled to or uncoupled from the line wires.

In the drawings:—Figure 1, is a perspective view of a pyrometer partly in section, showing it attached to a basin containing a molten substance whose temperature is to be ascertained. Fig. 2, is an elevation of the pyrometer with the sheathing removed. Fig. 3, is a section of the casings which inclose the conductors that are shown in elevation with the insulation partly broken away. Fig. 4, is a detail elevation of the plug of the pyrometer.

Referring to Fig. 1, a molten mass of metal B is shown in the container A, that is broken away for such showing.

C is an indication of the pyrometer as an entirety. In the showing of Fig. 1, it is set up upon blocks D.

This pyrometer measures by recording differences of conductivity in electrical conductors of different metals brought about by the temperature of the medium to be measured. It is a well known fact that the resistance in an electrical circuit varies with the heat of the circuit and varies with the substance of the circuit and, inasmuch as pyrometers working upon this principle are old in the art, I have not taken the trouble to describe or illustrate the recording mechanism, but have confined myself to the illustration and to the description of that part of the pyrometer that is subjected to the temperature to be measured and of the means for limiting the effects of the temperature to a definite extent in the conductors. Referring to Fig. 3, the detailed construction of these parts will be seen. 1 and 2 are the line wires of an electrical circuit that are properly insulated. These line wires are contained in a conduit 4 which is contained, in turn, in a pipe union 5. A pipe 6 screws into the pipe coupler 7. The pipe union 5 connects with the pipe 6 by being threaded thereon and the conduit 4 is held centrally of the pipe 6 and the union 5 by being screwed into a plug 8 that is threaded into the interior of the union 5. The pipe coupler 7 is a four-opening coupling, one opening receiving the pipe 6, the opposite opening receiving the pipe 9 which is a lead-away conduit for the cooling medium, as will be hereinafter described. The third opening is closed by a plug 10 which affords a convenient means of reaching the interior of the coupling and an opening opposite the plug 10 serves to allow the passage of the pyrometer conductors 11 and 12. These conductors are of different metals so as to vary in conductivity, for instance, I can make the pyrometer wire 11 of platinum alloy and the pyrometer wire 12 of platinum. The line wire conduit 4 leads into a second coupler 13 that is contained within the coupler 7 and which serves as an elbow for the electrical conductors. This second coupler 13, which will be termed the interior coupler for convenience of reference, is closed at its upper end by a screw plug 14, so that access can be readily had to the interior. Opposite the opening closed by the screw plug 14, the socket case 15 screws into the interior coupler 13. The line wires 1 and 2 bend in the coupler 13 and their ends protrude into the socket case 15 and through the porcelain cup 16. This porcelain cup has a pair of brass socket pieces 17 provided with conical recesses for the reception of the terminal inserts 18 of the pyrometer wires 11 and 12.

The line wires 1 and 2 are pinched into the brass socket pieces by the set-screws 19 and the pyrometer wires 11 and 12 are pinched into the terminal inserts by the set-screws 20. The socket case 15 screws into the coupler 7. Upon the outside threads of this socket case runs a collar 21 by which the terminal inserts that are mounted upon the insulated plug 22 may be forced into the socket pieces and held there. This is accomplished by inserting the collar 21 over the plug 22 after it has been inserted in the case 15 and running the collar upon the threads until the terminal inserts are securely wedged into the conical cavities of the socket pieces. The pyrometer wires 11 and 12 are united at their ends by being twisted together as at 23 to complete the circuit. They are insulated by numerous porcelain tubes 24 that are cut in short lengths so as to allow the wires to flex.

Connected with the union 5 is a pipe 25 which connects with a valve 26 and a water line that is controlled by a hand wheel 27. This water line furnishes a cooling medium that flows in the union 5, circulates about the conduit 4 and the inner coupler 13 and especially the upper portion of the socket case 15. The cooling medium is led away through the pipe 9 which connects with an up-traveling pipe 28, which in connection with the pipe 25, which is a down-traveling pipe, always insures the presence of water in the coupler 7 and about the socket pieces and the inserts. While the flow of water through the water line continues, the electrical circuit is cooled directly adjacent the end of the pyrometer wires and at the beginning of the line wires. This insures a definite length of conductors affected by the temperature to be measured and hence gives a definite basis upon which to base the measurements. The usual electrical devices for ascertaining the differences of conductivity in the circuits may be utilized, but are not shown.

30 is a sheathing that fits over the coupler 7 and the pyrometer wires.

What I claim is:—

1. In a pyrometer, the combination of a pair of pyrometer wires of varying conductivity, a plug carrying the terminals of the pyrometer wires, a socket member and line wires leading into the socket member, a cooling medium adapted to circulate about the line wires and the socket to confine the effects of the temperature to be measured to the pyrometer wires and the said plug of the pyrometer wires being insertible and removable from the socket of the line wires, substantially as described.

2. In a pyrometer, the combination of a pair of pyrometer wires, a plug carrying the terminals of the pyrometer wires, a socket member, line wires leading into the socket member, the said plug being adapted to be inserted or removed from the socket member and a collar adapted to hold the plug in relation to the socket member and adjust it with respect thereto and a cooling medium line about the line wires and the socket for confining the effects of the temperature to be measured to the pyrometer wires, substantially as described.

In testimony whereof, I sign this specification in the presence of two witnesses.

FREDRICK J. NICE.

Witnesses:
VIRGINIA C. SPRATT,
AGNES M. HIPKINS.